(12) United States Patent
Mathur et al.

(10) Patent No.: US 8,625,586 B2
(45) Date of Patent: Jan. 7, 2014

(54) GENERIC BUS DE-MULTIPLEXER/PORT EXPANDER WITH INHERENT BUS SIGNALS AS SELECTORS

(75) Inventors: Gaurav Mathur, Greater Noida (IN); Pratik Damle, Greater Noida (IN)

(73) Assignee: STMicroelectronics International N.V., Amsterdam (NL)

( * ) Notice: Subject to any disclaimer, the term of this patent is extended or adjusted under 35 U.S.C. 154(b) by 224 days.

(21) Appl. No.: 12/983,116

(22) Filed: Dec. 31, 2010

(65) Prior Publication Data

US 2012/0170587 A1    Jul. 5, 2012

(51) Int. Cl.
*H04L 12/50* (2006.01)

(52) U.S. Cl.
USPC .......................................... 370/386; 370/402

(58) Field of Classification Search
None
See application file for complete search history.

(56) References Cited

U.S. PATENT DOCUMENTS

| | | | |
|---|---|---|---|
| 5,619,722 A | 4/1997 | Lovrenich | |
| 5,999,518 A * | 12/1999 | Nattkemper et al. | 370/258 |
| 2005/0055592 A1* | 3/2005 | Velasco et al. | 713/322 |
| 2009/0234999 A1* | 9/2009 | Huang et al. | 710/110 |
| 2009/0259861 A1* | 10/2009 | Tune | 713/320 |
| 2011/0044163 A1* | 2/2011 | Nishioka | 370/217 |
| 2011/0281543 A1* | 11/2011 | White et al. | 455/337 |
| 2012/0096202 A1* | 4/2012 | Hofmann et al. | 710/110 |
| 2012/0311371 A1* | 12/2012 | Shaeffer | 713/501 |

* cited by examiner

*Primary Examiner* — Phirin Sam
(74) *Attorney, Agent, or Firm* — Hogan Lovells US LLP

(57) ABSTRACT

A circuit comprising: a device determiner configured to, in a first mode of operation, receive a device selection signal via at least one of: at least one control line and at least one signal line; and a device router configured to, in a second mode of operation, route signals between the at least one of: at least one control line and at least one signal line and at least one device dependent on the device selection signal.

12 Claims, 7 Drawing Sheets

GENERIC BUS DE-MULTIPLEXER/PORT EXPANDER WITH INHERENT BUS SIGNALS AS SELECTORS

SCOPE OF THE APPLICATION

The present invention relates to device selection, for example but not exclusively to device selection in integrated circuits.

BACKGROUND OF THE APPLICATION

The general principle of connecting or coupling devices together using for example a control bus for selecting some element within the remote device and data bus for providing or retrieving information concerning the element within the remote device are generally known. For example systems containing one master device and one slave device and where the master device communicates with the slave device and the slave device performs data transactions as per a predefined protocol are generally known and implemented widely.

However such single master single slave communication couplings typically fail where additional devices use the same bus or, link, or coupling. In such systems where there is more than one slave device typically a device address bus is implemented to select one of the devices. For example a typical example is shown in FIG. 1 where a master device (port) 1 can be coupled to a first device 'Device 1' $10_1$ and a second device 'Device 2' $10_2$ via a main clock coupling (MAIN CLOCK) 3, a control signal coupling (CTRL_SIG_OUT) 5 and a data signal coupling (DATA_OUT) 7. The master device 1 in order to select one of the devices to communicate with is further coupled to an address logic decoder (Logic) 9 using a dedicated select address coupling 15 on which dedicated select signals can be sent. The address logic decoder 9 can furthermore be coupled to each of the devices via additional dedicated selection couplings (such as shown in FIG. 1 by the first dedicated select coupling 16 between the logic 9 and the first device $10_1$ and the second dedicated select coupling 17 between the logic 9 and the second device $10_2$.

As dedicated lines or couplings are required for each device this can limit expansion in the design. In other words it is not possible to increase the number of slave devices in the system beyond the number of dedicated couplings between the address logic decoder and device. Furthermore such approaches require additional coupling lines between the master device, address decoding device and the slave devices as well as a specific address decoding logic apparatus.

SUMMARY OF THE APPLICATION

It is an aim of embodiments of the present application to overcome these problems by using the already present data/control coupling to be used as device selection lines or couplings and so a flexible selection of devices.

According to a first aspect, there is provided a circuit comprising: a device determiner configured to, in a first mode of operation, receive a device selection signal via at least one of: at least one control line and at least one signal line; and a device router configured to, in a second mode of operation, route signals from the at least one of: at least one control line and at least one signal line to at least one device dependent on the device selection signal.

The device determiner may comprise: a counter configured to receive a first clock signal via a clock line as a reset input and to receive a second clock signal via at least one of: at least one control line and at least one signal line as the clock input; and a decoder configured to receive an output from the counter and generate a latch activation signal when a determined number of second clock signal cycles is reached.

The selector determiner may further comprise a latch configured to latch the device selection signal via the remainder of the at least one control line and at least one signal line dependent on the latch activation signal.

The latch may be further configured to concatenate at least two latched device selection signals over at least two second clock signal cycles; wherein the device router is configured to in the second mode of operation, route signals from the at least one of: at least one control line and at least one signal line to at least one device dependent on the concatenated device selection signal.

The device router may comprise a demultiplexer configured to receive the device selection signal as a selector input; the main clock signal as the clocked input; and the at least one of: at least one control line and at least one signal line as the signal input.

A router may comprise the circuit as described herein.

An integrated circuit may comprise the circuit as described herein.

According to a second aspect, there is provided a method of routing signals comprising: determining a first mode of operation; receiving, in the first mode of operation, via at least one of: at least one control line and at least one signal line a device selection signal; determining a second mode of operation; and routing signals, in the second mode of operation, received via the at least one of: at least one control line and at least one signal line to at least one device dependent on the device selection signal.

Determining a first mode of operation may comprise: receiving a first clock signal via a clock line and a second clock signal via at least one of: at least one control line and at least one signal line as the clock input; and generating a first mode activation signal when determining an absence of the first clock signal for a determined number of second clock signal cycles.

Receiving, in the first mode of operation, may further comprise latching the device selection signal via the remainder of the at least one control line and at least one signal line dependent on the first mode activation signal.

Receiving, in the first mode of operation, may further comprise concatenating at least two latched device selection signals over a determined number of second clock signal cycles.

Determining a second mode of operation may comprise determining a valid first clock signal.

Routing signals may comprise: receiving signals to be routed via the at least one of: at least one control line and at least one signal line; demultiplexing the signals to be routed dependent on the device selection signal.

According to a third aspect there is provided a computer-readable medium encoded with instructions that, when executed by a computer, perform: determining a first mode of operation; receiving, in the first mode of operation, via at least one of: at least one control line and at least one signal line a device selection signal; determining a second mode of operation; and routing signals, in the second mode of operation, received via the at least one of: at least one control line and at least one signal line to at least one device dependent on the device selection signal.

Determining a first mode of operation may cause the computer to perform: receiving a first clock signal via a clock line and a second clock signal via at least one of: at least one control line and at least one signal line as the clock input; and generating a first mode activation signal when determining an absence of the first clock signal for a determined number of second clock signal cycles.

Receiving, in the first mode of operation, may cause the computer to perform latching the device selection signal via the remainder of the at least one control line and at least one signal line dependent on the first mode activation signal.

Receiving, in the first mode of operation, may cause the computer to perform concatenating at least two latched device selection signals over at least a determined number of second clock signal cycles.

Determining a second mode of operation may cause the computer to perform determining a valid first clock signal.

Routing signals may cause the computer to perform: receiving signals to be routed via the at least one of: at least one control line and at least one signal line; demultiplexing the signals to be routed dependent on the device selection signal.

According to a fourth aspect there is provided an apparatus comprising at least one processor and at least one memory including computer program code the at least one memory and the computer program code configured to, with the at least one processor, cause the apparatus at least to perform: determining a first mode of operation; receiving, in the first mode of operation, via at least one of: at least one control line and at least one signal line a device selection signal; determining a second mode of operation; and routing signals, in the second mode of operation, received via the at least one of: at least one control line and at least one signal line to at least one device dependent on the device selection signal.

Determining a first mode of operation may cause the apparatus to perform: receiving a first clock signal via a clock line and a second clock signal via at least one of: at least one control line and at least one signal line as the clock input; and generating a first mode activation signal when determining an absence of the first clock signal for a determined number of second clock signal cycles.

Receiving, in the first mode of operation, may cause the apparatus to perform latching the device selection signal via the remainder of the at least one control line and at least one signal line dependent on the first mode activation signal.

Receiving, in the first mode of operation, may cause the apparatus to perform concatenating at least two latched device selection signals over at least a determined number of second clock signal cycles.

Determining a second mode of operation may cause the apparatus to perform determining a valid first clock signal.

Routing signals may cause the apparatus to perform: receiving signals to be routed via the at least one of: at least one control line and at least one signal line; demultiplexing the signals to be routed dependent on the device selection signal.

According to a fifth aspect there is provided an apparatus comprising: device determiner means configured to, in a first mode of operation, receive a device selection signal via at least one of: at least one control line and at least one signal line; and device router means configured to, in a second mode of operation, route signals from the at least one of: at least one control line and at least one signal line to at least one device dependent on the device selection signal.

The device determiner means may comprise: counter means configured to receive a first clock signal via a clock line as a reset input and to receive a second clock signal via at least one of: at least one control line and at least one signal line as the clock input; and decoder means configured to receive an output from the counter and generate a latch activation signal when a determined number of second clock signal cycles is reached.

The selector determiner means may further comprise latch means configured to latch the device selection signal via the remainder of the at least one control line and at least one signal line dependent on the latch activation signal.

The latch means may be further configured to concatenate at least two latched device selection signals over at least two second clock signal cycles; wherein the device router means may be configured to in the second mode of operation, route signals from the at least one of: at least one control line and at least one signal line to at least one device dependent on the concatenated device selection signal.

The device router means may comprise a demultiplexer configured to receive the device selection signal as a selector input; the main clock signal as the clocked input; and the at least one of: at least one control line and at least one signal line as the signal input.

SUMMARY OF THE FIGURES

Reference will be made by way of example only to the accompanying drawings in which.

DESCRIPTION OF THE EXAMPLE EMBODIMENTS

This document describes apparatus and methods for a device selector configured to enable device selection without the need for specified or distinct device selection address coupling.

Figure 1:
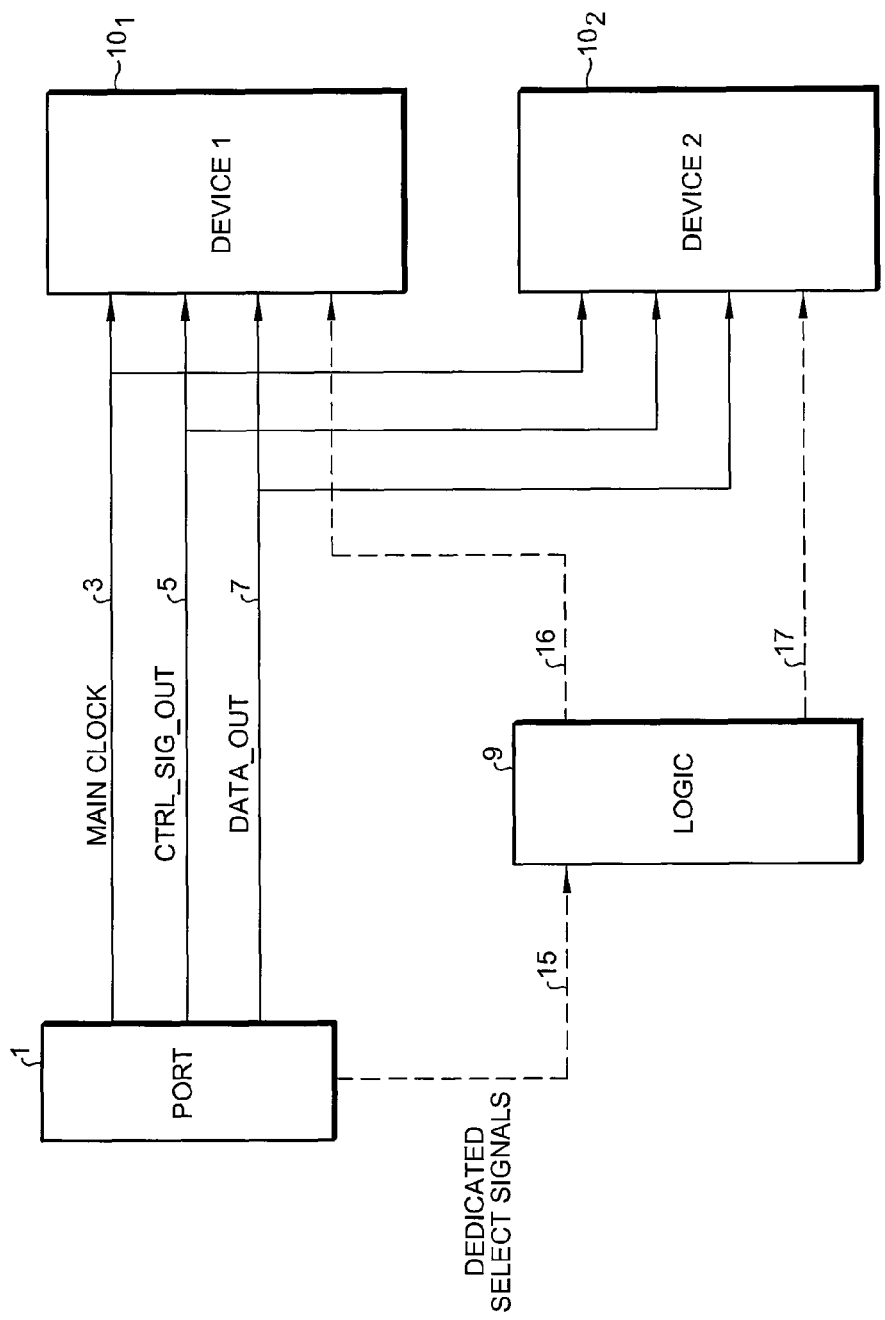
FIG. 1 shows schematically a device selection system employing control, data and selection bus configuration.
Figure 2:
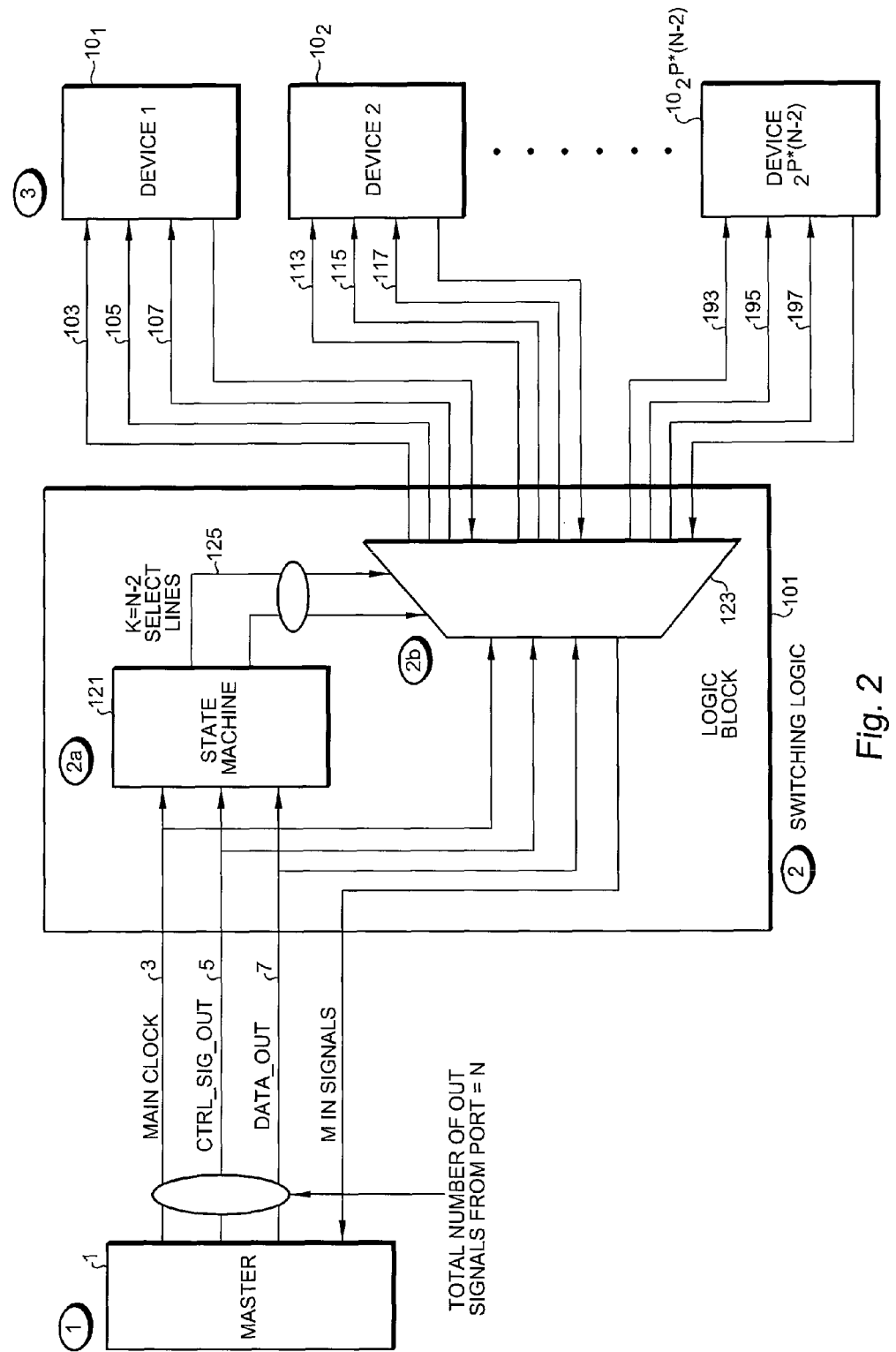
FIG. 2 shows schematically a device selection system according to some embodiments.

With respect to FIG. 2, a schematic view of a device selection system is shown with respect to some embodiments of the application. Furthermore with respect to FIGS. 5 and 6 flow diagrams of the operation of the device selection system according to some embodiments of the application are shown.

The device selection system and operation of the device selection system is described herein in such a way to clearly explain the operation of embodiments of the application, however the operations of data exchange and post-selection operations are generally known and will not be described in further detail.

Furthermore the following examples are described with respect to a circuit with discrete components, however it would be understood that in some embodiments the same components and operations can be applied to other circuits such as integrated circuit, FPGA circuits, printed circuit board circuits etc.

In some embodiments, as shown in FIG. 2, the device selection system comprises a master device 1 configured to control the flow of information between the master device 1 and any slave devices 10 selected. In some embodiments the master device 1 can be a port configured to be coupled to a further device such as a processor or memory via a coupling. The master device 1 is in some embodiments configured to output a number N of signals on a number N of couplings or lines, where the minimum number for N is 3, a main clock coupling, a secondary clock coupling and a device selection coupling. Although the minimum number of couplings is 3 any number greater than 3 of couplings can be implemented in embodiments of the application. In some embodiments the couplings, connections or lines for transporting signals to and from the master device 1 can comprise: a main clock coupling 3 configured to carry a main clock signal for synchronising data and control operations between the master device 1 and any slave device 10; and at least two further couplings from either/or control couplings 5 configured to typically carry control signals to and from the master device 1 such as an internal device address; and data couplings 7 configured to typically carry data to and from the master device 1 such as for example a value to be loaded into the internal device address provided by the control signal. Hence in some embodiments the device selection system comprises at least a main clock coupling 3, and at least two further control couplings 5, or a main clock coupling 3, at least one control coupling 5, and at least one data coupling 7, or a main clock coupling 3, and at least two data couplings 7. In the following examples the master device 1 is configured to output signals on a main clock coupling 3, at least one control coupling 5, and at least one data coupling 7 however it would be understood that the following description can be used to assist in the understanding of the main clock and only control couplings and main clock and only data couplings embodiments.

In some embodiments the device selection circuit comprises switching logic 101. The switching logic 101 is configured to receive the signals output from the master device 1 on the main clock, control and data couplings and to route these signals, when in a functional mode, to a selected slave device 10. In some embodiments the switching logic 101 is configured to be coupled to each slave device by an associated set of device main clock, control and data couplings. In some embodiments the switching logic 101 is configured to also receive data signals, which can be carried over M couplings output from each of the slave device 10 and route these signals, when in a functional mode, to the master device. The routing performed by the switching logic 101 is such that the selected slave device 10 is coupled to the master device 1 so as to enable data to be passed from the selected slave device 10 to the master device 1.

In some embodiments the switching logic comprises a state machine 121 and a logic block 123.

The state machine 121 in such embodiments is configured to receive the main clock signal carried by the main clock coupling 3, the control signals carried on the at least one control coupling 5 and data signals carried on the at least one data coupling 7. The state machine 121 is further configured in some embodiments to output a selection signal carried by at least one selection coupling 125 to the logic block 123.

The logic block 123 is also configured in some embodiments to receive the main clock signal carried by the main clock coupling 3, the control signals carried on the at least one control coupling 5 and data signals carried on the at least one data coupling 7. The logic block is configured in some embodiments to further receive the selection signal carried by at least one selection coupling 125 and configured dependent on the value of the selection signal to route the signals the main clock signal, the control signals and data signals via one of associated set of device main clock, control and data couplings to one of the slave devices 10.

For example the logic block 123 can be configured to output signals to a first slave device (Device 1) 10₁ on a first set of output couplings, to a second slave device (Device 2) 10₂ on a second set of output couplings and a $2^{P*(N-2)}$'th slave device on a $2^{P*(N-2)}$'th set of output couplings. Each of the sets of output couplings from the logic block 123 to the devices comprises an output main clock coupling 103, 113, 193, an output control coupling 105, 115, 195 and an output data coupling 107, 117, 197.

In some embodiments the logic block 123 comprises a demultiplexer.

Figures 3, 3A, 3B:
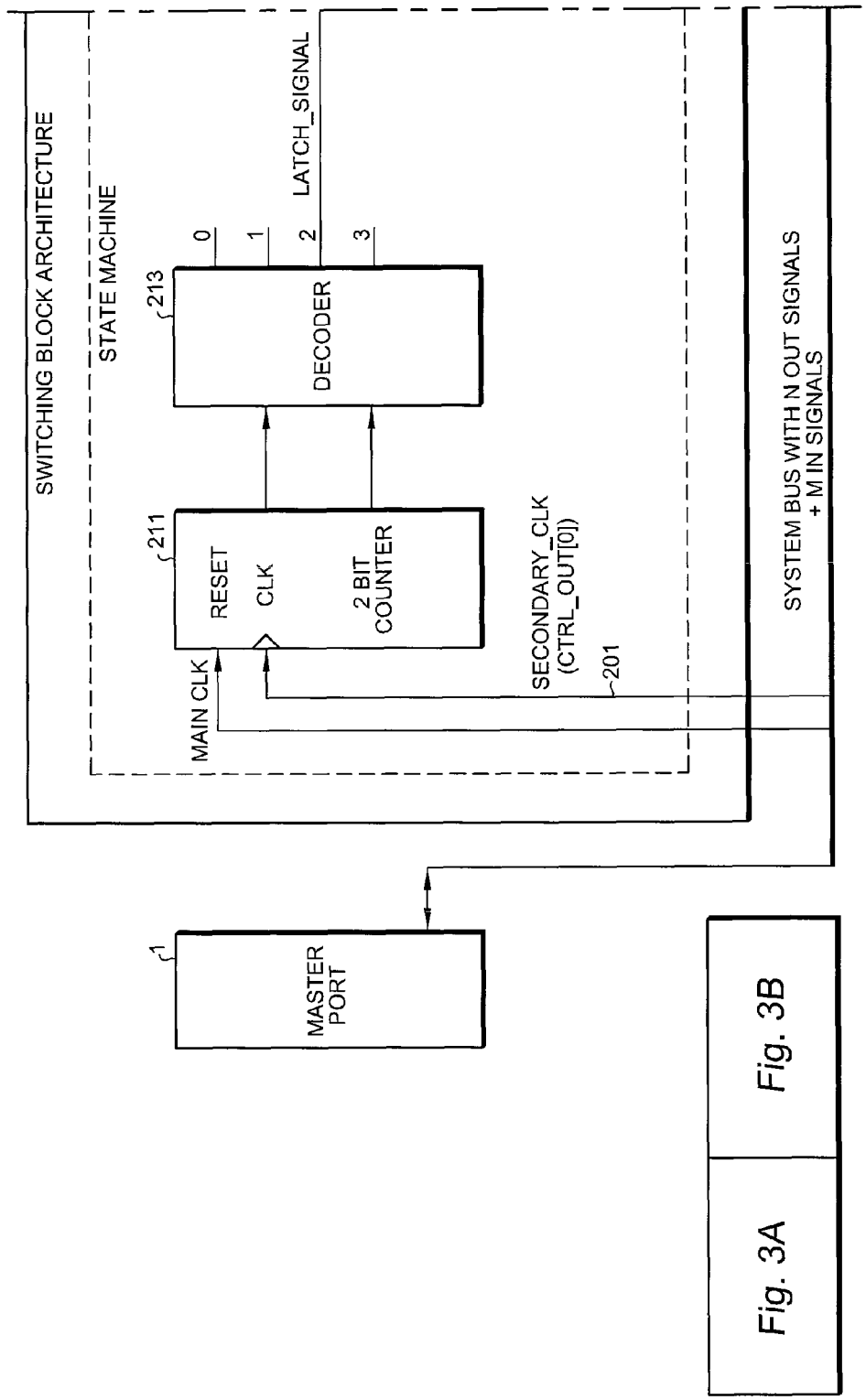
FIG. 3 shows schematically the switching logic as shown in FIG. 2.
Figure 3B:
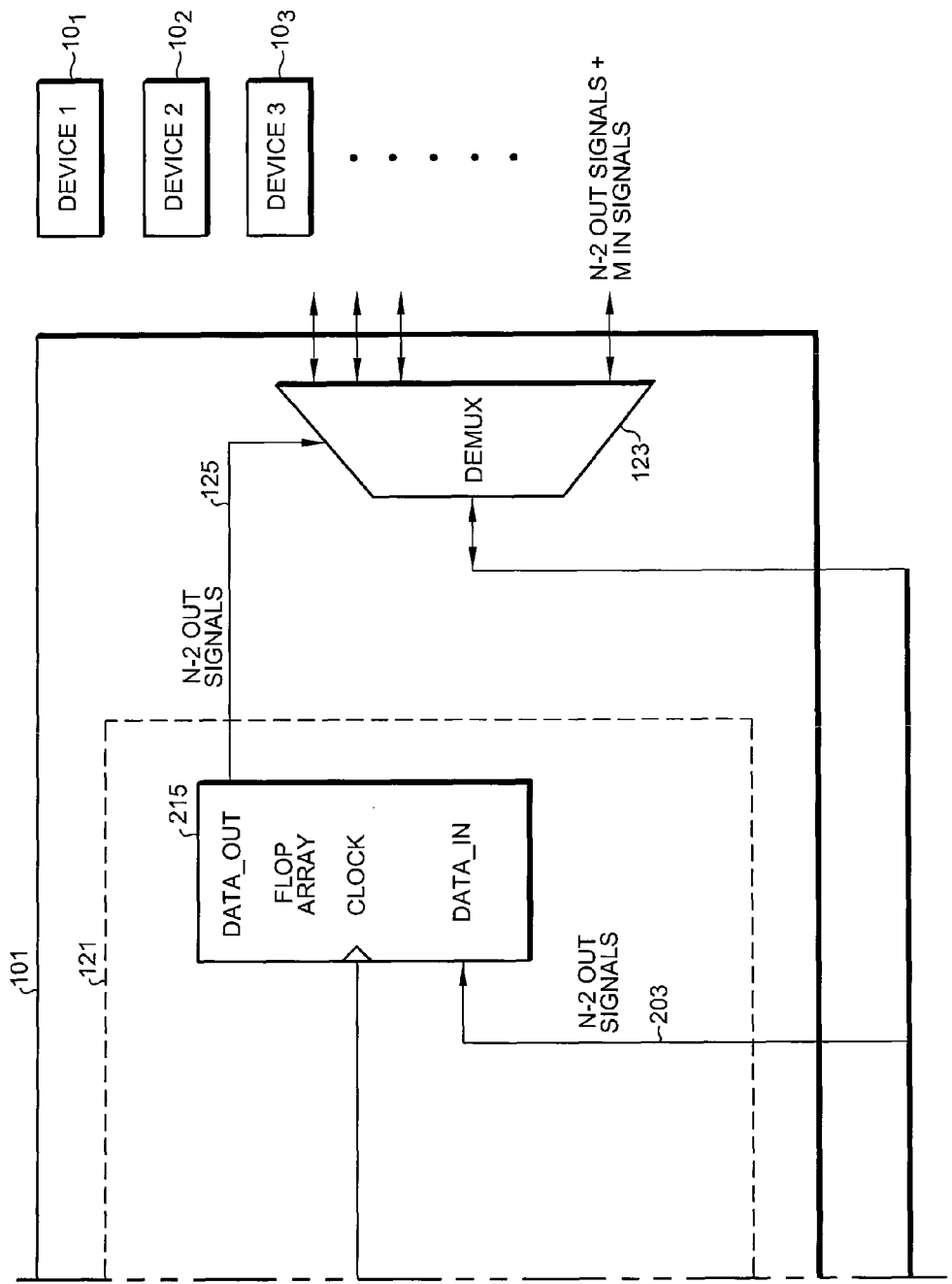

With respect to FIG. 3 the switching logic 101 and specifically the state machine 121 shown in FIG. 2 is shown in further detail.

In some embodiments the state machine 121 comprises a counter 211. In the example shown in FIG. 3 the counter 211 is a 2-bit counter but in some other embodiments any suitable length of counter can be employed. The counter 211 is configured to receive the main clock signal (Main CLK) from the main clock coupling 3. In some embodiments the main clock signal can be employed as a Reset input to the counter 211. Furthermore the counter 211 is configured to receive a secondary clock signal carried by at least one of the control or data couplings. In the example shown in FIG. 3 the secondary clock signal is carried from the master device 1 by the least significant bit control coupling (CTRL_OUT[0]) 201. In some embodiments the counter 211 is configured to receive the secondary clock signal as the clock input (CLK). Furthermore in some embodiments the counter 211 is configured to output the result of the counter to a decoder 213.

The state machine 121 in some embodiments further comprises a decoder 213 configured to receive the output of the counter 211 and at a specific counter value to output a enable signal or latch signal to a Flop Array 215. In some embodiments the decoder is configured to output an enable signal when the selection input is at a defined value which is passed to the Flop Array 215. As can be seen in the example shown in FIG. 3 the decoder 213 is configured to output the latch signal when the value of the counter reaches 2. In some embodiments the determined output value can be any suitable value of the counter 211.

In some embodiments the state machine 121 further comprises flop array 215 or data latch configured to receive an input signal carried by the remainder of the input couplings from the master device 1 and is latched by the latch signal received from the decoder 213. Thus in some embodiments, for example as shown in FIG. 3, where the main clock coupling 3 and one (the least significant bit element) of the control couplings 201 has been used to carry the main and secondary clock signals the remainder of the control and data couplings 203 (N−2) are configured to be received as the data input (Data_in) to the flop array 215. In some embodiments the latch signal from the decoder 213 is coupled to the clock input (clock) of the flop array 215 and thus the flop array is configured to output and latch a value of the data input to be output via a flop array data output (Data_out) when the flop array clock input is enabled. The flop array 215 data output is further in some embodiments to be configured to be coupled to the selection input of the demultiplexer 123.

Figure 5:
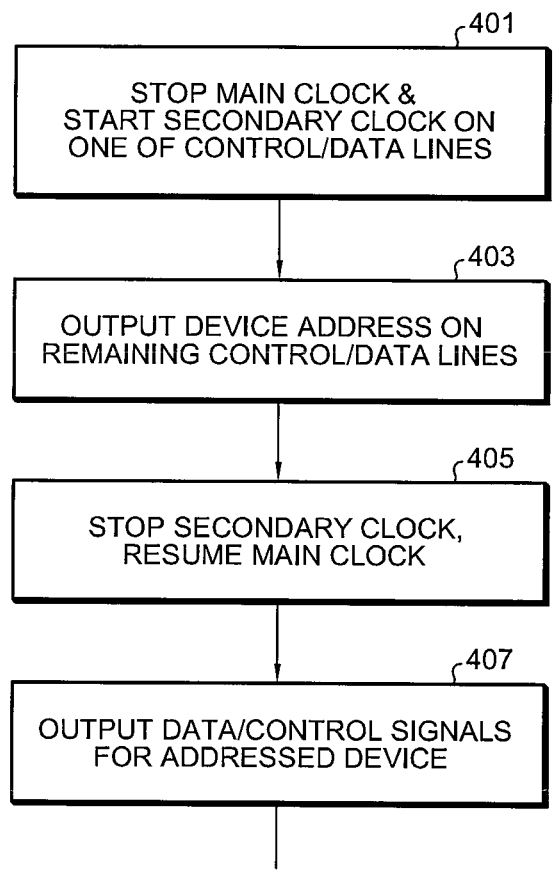
FIG. 5 shows a flow diagram of the operations performed by the master device according to some embodiments of the application.
Figure 6:
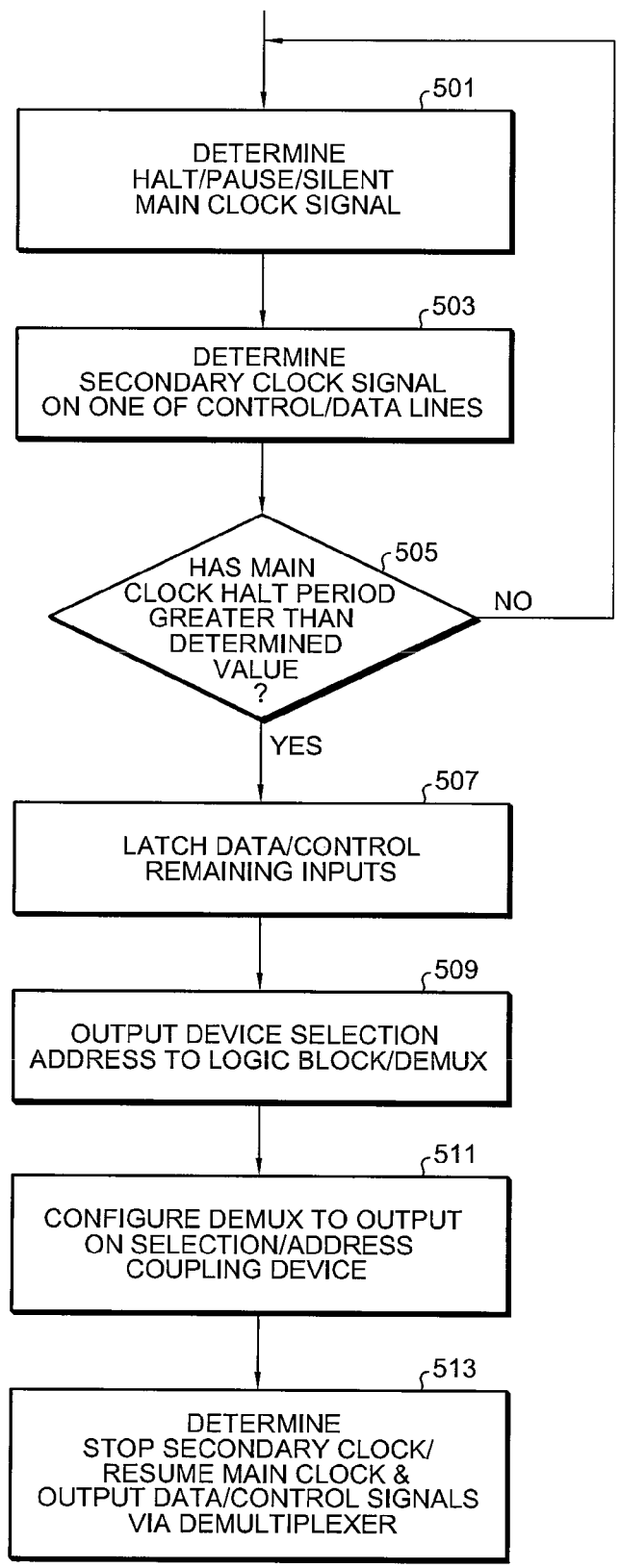
FIG. 6 shows a flow diagram of the operations performed by the switching logic according to some embodiments of the application.

With respect to FIGS. 5 and 6 the operation of the selection system is shown in further detail. With respect to FIG. 5 the operation of device selection from the viewpoint of the master device 1 is shown as a series of flow chart blocks. With respect to FIG. 6 the operation device selection from the viewpoint of the switching block 101 is shown in further detail as a series of flow chart blocks.

The master device 1 in some embodiments is configured to stop the main clock signal and to start the secondary clock signal using one of the control/data couplings or lines. In the example shown in FIG. 3 the secondary clock signal is output on the least significant bit control signal coupling 201. In some other embodiments the master device 1 can use any one of the control/data couplings to carry the secondary clock signal. Thus where for example there is only one data coupling or line and only one control coupling or line one or other of the control or data lines can be used to supply the secondary clock signal to the switching logic 101.

The operation of stopping the main clock signal and starting the secondary clock signal is shown in FIG. 5 by step 401.

The switching logic 101 and specifically the state machine 121 is configured to receive both the couplings carrying the main clock signal and the secondary clock signal and determine a stopped main clock signal. In the example of the state machine 121 shown in FIG. 3 the main clock signal is used to reset a counter 211 and thus when the main clock signal is stopped the reset input is deactivated enabling the counter 211 to operate and register input clock signal state changes.

The determination of the stopped main clock signal is shown in FIG. 6 by step 501.

Furthermore the state machine 121 in the switching block 211 is further configured to determine the start of the secondary clock signal carried on one of the control/data lines or couplings. For example as shown in FIG. 3 the counter 211 receives the secondary clock signal on the least significant bit control coupling (CTRL_OUT [0]) 201 at the clock input (CLK). In other words the counter 211 is able to determine an input secondary clock signal state changes by incrementing the counter output (providing as discussed herein the reset signal, the main clock signal, is de-enabled or stopped).

The determination of the secondary clock signal is shown in FIG. 6 by step 503.

The state machine furthermore is configured to determine a when a 'minimum' period since the main clock signal has been stopped has been reached. In some embodiments such as shown in FIG. 3 this stopped main clock period is determined by the combination of the counter 211 outputting the number of secondary clock signal cycles since the main clock has been stopped and the decoder 213 configured to receive the output of the counter 211 and output an enable or latch signal when the value of the counter 211 reaches a determined value. Thus for example the decoder 213 in FIG. 3 is configured to output the latch signal (latch_signal) when the counter reaches the value 2. However it would be understood that the latch signal could be output at any suitable value. Furthermore in some embodiments as described herein more than one latch signal can be generated.

In other words the state machine can be understood to carry out a check whether or not the period since the main clock signal has been stopped is greater than or equal to a determined value. This check operation is shown in FIG. 6 by step 505. When the period of the stopped main clock signal is not greater to or equal to a determined value the operation passes back to the operations of determining the stopped main clock signal and continued secondary clock signal. However when the period of the stopped main clock is equal to or greater than the determined value the operation can pass to the next step such as the outputting of a latch signal as described herein.

The master device 1 furthermore can be configured to output a device selection signal or address being carried on the remaining unused control and data couplings or lines. As described herein the device selection signal or device selection address value can be output over a determined number of clock cycles or be output over a number of clock cycles as described herein. In a following example the number of slave devices from which one is selected is less than or equal to $2^{(N-2)}$ (N being the number of couplings from the master device 1 to the switching block 101) and as such the address or device selection signal can be output from the master device in a determined number of clock cycles. An example of the number of clock cycles the device selection address can be output over is 2.

The output of the device selection signal or device selection address on the remaining control and data lines or couplings is shown in FIG. 5 by step 403. It would be understood that in some embodiments the master device 1 could output the device selection signal (or first part of the device clock selection signal) on the clock cycle after the main clock signal is stopped or any time up to the determined stopped clock period value.

The state machine 211 and in some embodiments the flop array 215 as described herein is configured to receive the latch signal from the decoder 121 as the flop array clock input (Clock) and the device selection signal from the master device 1 at the flop array data input (Data_in). Thus the flop array 215 is configured to, when the latch signal is enabled, to latch the device selection signal via the remaining control and data lines or couplings.

The latching of the data and control remaining inputs, in other words the device selection signal, is shown in FIG. 6 by step 507.

The state machine 211 and in some embodiments the flop array 215 can furthermore output the latched device selection signal to the logic block 123 on the selection couplings (N−2 lines wide) 125.

The operation of outputting the device selection address to the logic block 123 is shown in FIG. 6 by step 509.

The logic block 123 which in some embodiments, as shown in FIG. 3, comprises a de-multiplexer can furthermore be configured to route any signals received on the data input to a device dependent on the value of the selection signal. In such embodiments therefore the main clock, control and data signals received via the main clock, control and data couplings respectively are selectively routed dependent on the value of the selection signal output from the flop array 215 to a device via an associated device main clock, control and data coupling.

The configuration of the multiplexer to set up the outputting of received signals dependent on the selection device address to a set of lines or couplings associated with a slave or further device is shown in FIG. 6 by step 511.

The master device 1 furthermore can be configured, having output the device selection address on the remaining control/data lines, to stop the secondary clock and resume the operation of the main clock.

The operation of the stopping of the secondary clock and resuming the main clock is shown in FIG. 5 by step 405.

The switching logic 101 and in particular the state machine 121 can further be configured to determine the stopping of the secondary clock signal and the resumption of the main clock signal. For example, as shown in FIG. 3, in some embodiments the counter 211 reset input provided by the main clock signal resets the counter which in turn de-enables the latch signal generated by the decoder 213 and the flop array 215 data input signals are not latched or passed to the multiplexer The determination of the stopping of the secondary clock and the resumption of the main clock in FIG. 6 by step 513.

Furthermore the master device 1 can, after restarting the main clock signal, be configured to output data/control signals for the selected addressed device. The operation of the master device in a functional mode can then be seen in FIG. 5 by step 407.

The switching logic 101 and in some embodiments the de-multiplexer 123 having been configured to route the received input signals to a device dependent on the previously received device election signal is thus configured to output the clock, data, control signals to the device.

In some embodiments the switching logic 101 is a 2-way de-multiplexer 123, in other words configured to allow signals to pass both ways through the de-multiplexer 123 whereas in some other embodiments the de-multiplexer is configured to only permit signals to pass from the master device 1 to the slave device 10.

Figure 4:
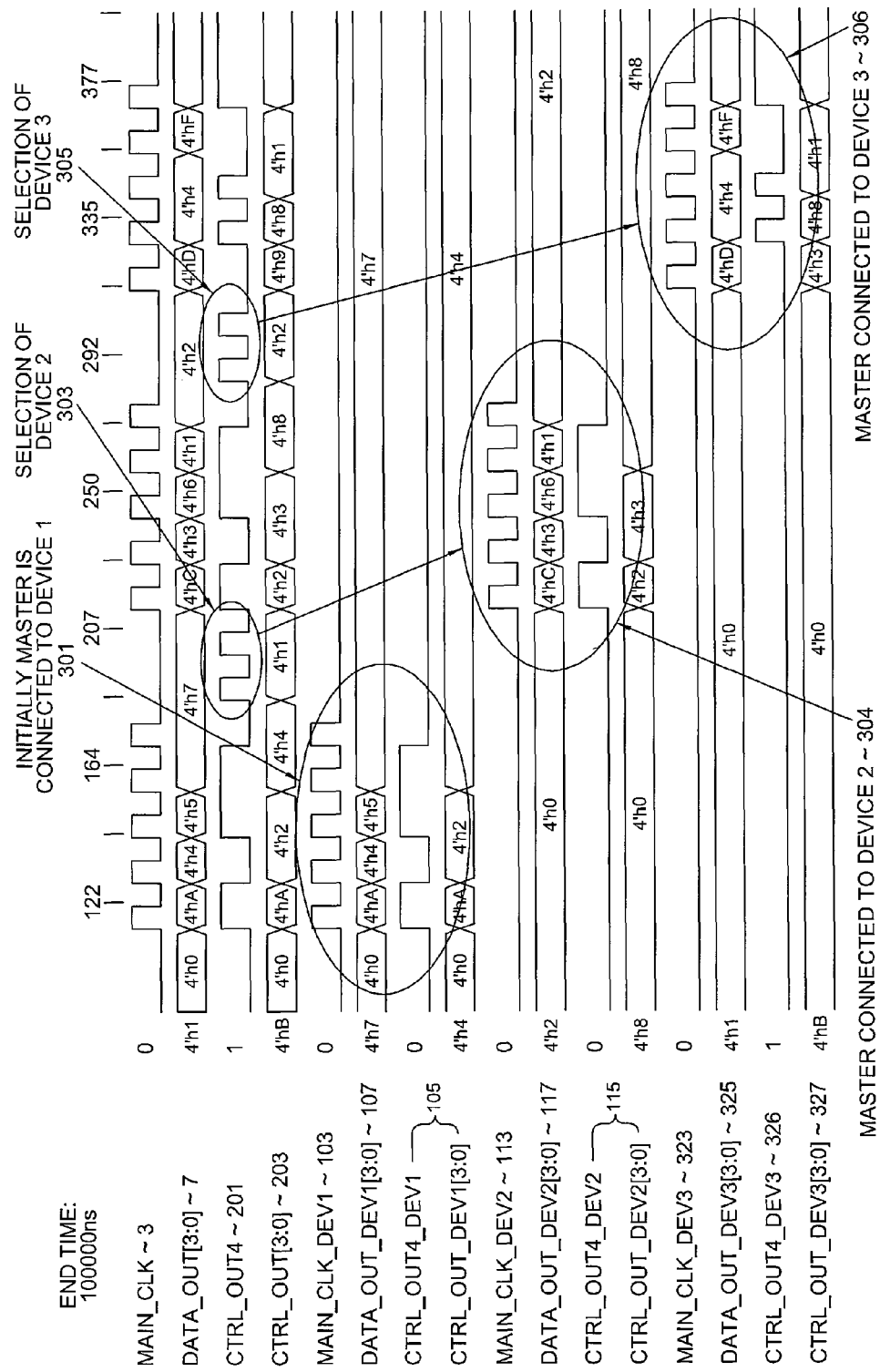
FIG. 4 shows a timing diagram of signals showing an example device selection system employing embodiments of the application.

With respect to FIG. 4 a timing diagram shows examples of the switching operations of the device selection system according to some embodiments of the application. The selection of three different slave devices is shown in this example.

The signals generated by the master device 1 shown in FIG. 4 are the main clock signal (MAIN_CLK) 3, the data signal (DATA_OUT[3:0] indicating a 4 bit wide data signal) 7 and the control signal (CONTROL_OUT[3:0] 203 and CONTROL_OUT4 201). In other words the control signal can be seen in some embodiments to be a 4 bit wide signal.

In the first part of the timing diagram the switching block 101 and in some embodiments the logic block 123 which can be a de-multiplexer is configured to receive master device main clock signal, data signal and control signal and output these to a first device 10$_1$ as shown by the first highlighted region 301 and where the main clock signal is shown on the first device main clock coupling (MAIN_CLK_DEV1) 103, the data signal is shown in the first device data coupling (DATA_OUT_DEV1[3:0]) 107 and the control signal is shown in the control couplings (CONTROL_OUT_DEV1[3:0] and CONTROL_OUT4_DEV1) 105.

As can be seen in FIG. 4 the main clock signal is stopped (approximately 180 ns into the simulation), the secondary clock signal is started and carried on one of the control lines CONTROL_OUT4 201. Furthermore the master device passes the device selection signal on the remaining data and control couplings. The device selection signal which indicates that the next device to be selected is Device 2 10$_2$ when the required number of secondary clock cycles have been detected with the main clock signal stopped, which in this example is 2, is latched into the de-multiplexer 123. The de-multiplexer 123 then when the main clock signal is restarted routes the main clock, data and control signals to device 2 10$_2$ as is shown by the master device main clock, control and data signals appearing on the second device main clock coupling (MAIN_CLK_DEV2) 113, second device data coupling (DATA_OUT_DEV2[3:0]) 117 and second device control couplings (CONTROL_OUT_DEV2[3:0] and CONTROL_OUT4_DEV2) 115.

Similarly when the main clock signal is stopped again (approximately 280 ns into the simulation), the secondary clock signal is started and carried on one of the control lines CONTROL_OUT4 201. Furthermore the master device passes the device selection signal on the remaining data and control couplings. The device selection signal which indicates that the next device to be selected is Device 3 10$_3$ is latched into the de-multiplexer 123. The de-multiplexer 123 then when the main clock signal is restarted routes the main clock, data and control signals to Device 3 10$_3$ as is shown by the master device main clock, control and data signals appearing on the third device main clock coupling (MAIN_CLK_DEV3) 123, third device data coupling (DATA_OUT_DEV3[3:0]) 127 and third device control couplings (CONTROL_OUT_DEV3[3:0] and CONTROL_OUT4_DEV3) 125.

In some embodiments, for example where there are more than $2^{(N-2)}$ devices to be selected from (where as described herein N is the number of couplings or lines between the master device 1, the switching block 101 and the devices 10) the device selection signal can be transmitted by the master device 1 to the switching block 101 over more than two clock cycles in order that the full range of devices are selectable. For example in some embodiments the device selection signal or address can be divided into sections each of which is equal to N−2 bits wide are transmitted by the master device 1 to the switching block 101 where the complete device selection signal or address can be reassembled and decoded to select the device.

In such embodiments a maximum number of devices selectable can be $2^{P*(N-2)}$ where P is the number of sections the address signal is divided into. In some embodiments this can be implemented for example in some embodiments by using P flop arrays each configured to latch a section of the address signal on receiving a latch signal associated with the section to be latched. In other words the first flop array configured to receive the first section of the selection address receiving a latch signal when the counter reaches a first value, for example 2. Similarly the second flop array configured to receive the second section of the selection address receiving a latch signal when the counter reaches a second value, for example 3, and so on. When all of the sections of the selection signal have been latched the concatenated results of all of the flop arrays can be passed to the demultiplexer. In some other embodiments the reconstruction of the sectioning of the selection signal can be carried out by using a buffer, for example a FIFO buffer which is coupled to the flop array and is progressively filled as sections of the selection signal are latched before the buffer is parallel output to the multiplexer.

In some embodiments the determination of whether a full device selection address has been latched is an implicit action determined by the stopped main clock signal and the continued operation of the secondary clock signal.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto.

While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this application can be implemented by computer software executable by a data processor, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

As used in this application, the term 'circuitry' can refer to hardware-only circuit implementations (such as implementations in only analog and/or digital circuitry) and to combinations of circuits and software (and/or firmware), such as: to a combination of processor(s) or (ii) to portions of processor(s)/software (including digital signal processor(s)), software, and memory(ies) that work together to cause an apparatus, such as a mobile phone or server, to perform various functions and to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware.

Whilst this detailed description has set forth some embodiments of the present invention, the appended claims cover other embodiments of the present application which differ from the described embodiments according to various modifications and improvements. Other applications and configurations may be apparent to the person skilled in the art.

The invention claimed is:

1. A circuit comprising:
    a device determiner configured to, in a first mode of operation, receive a device selection signal via at least one of: at least one control line; and at least one signal line; and
    a device router configured to, in a second mode of operation, route signals between the at least one of: at least one control line and at least one signal line and at least one device dependent on the device selection signal,
    wherein the device determiner comprises:
        a counter configured to receive a first clock signal via a clock line as a reset input and to receive a second clock signal via at least one of: at least one control line and at least one signal line as the clock input; and
        a decoder configured to receive an output from the counter and generate a latch activation signal when a determined number of second clock signal cycles is reached.

2. The circuit as claimed in claim 1, wherein the device determiner further comprises a latch configured to latch the device selection signal via the remainder of the at least one control line and at least one signal line dependent on the latch activation signal.

3. The circuit as claimed in claim 2, wherein the latch is further configured concatenate at least two latched device selection signals over at least two second clock signal cycles; wherein the device router is configured to in the second mode of operation, route signals from the at least one of: at least one control line and at least one signal line to at least one device dependent on the concatenated device selection signal.

4. The circuit as claimed in claim 1, wherein the device router comprises a demultiplexer configured to receive the device selection signal as a selector input; the main clock signal as the clocked input; and the at least one of: at least one control line and at least one signal line as the signal input.

5. A router comprising the circuit as claimed in claim 1.

6. An integrated circuit comprising the circuit as claimed in claim 1.

7. A method of routing signals, the method comprising:
    configuring a device determiner to, in a first mode of operation, receive a device selection signal via at least one of: at least one control line; and at least one signal line; and
    configuring a device router to, in a second mode of operation, route signals between the at least one of: at least one control line and at least one signal line and at least one device dependent on the device selection signal,
    wherein the device determiner comprises:
        a counter configured to receive a first clock signal via a clock line as a reset input and to receive a second clock signal via at least one of: at least one control line and at least one signal line as the clock input; and
        a decoder configured to receive an output from the counter and generate a latch activation signal when a determined number of second clock signal cycles is reached.

8. The method as claimed in claim 7, wherein the device determiner further comprises a latch configured to latch the device selection signal via the remainder of the at least one control line and at least one signal line dependent on the latch activation signal.

9. The method as claimed in claim 8, wherein the latch is further configured concatenate at least two latched device selection signals over at least two second clock signal cycles; wherein the device router is configured to, in the second mode of operation, route signals from the at least one of: at least one control line and at least one signal line to at least one device dependent on the concatenated device selection signal.

10. The method as claimed in claim 7, wherein the device router comprises a demultiplexer configured to receive the device selection signal as a selector input; the main clock signal as the clocked input; and the at least one of: at least one control line and at least one signal line as the signal input.

11. The method as claimed in claim 7, performed within a router.

12. The method as claimed in claim 7, performed within an integrated circuit.

* * * * *